Aug. 17, 1937.  W. E. HAUPT  2,090,397
AUTOMATIC CLUTCH MECHANISM
Filed July 25, 1933
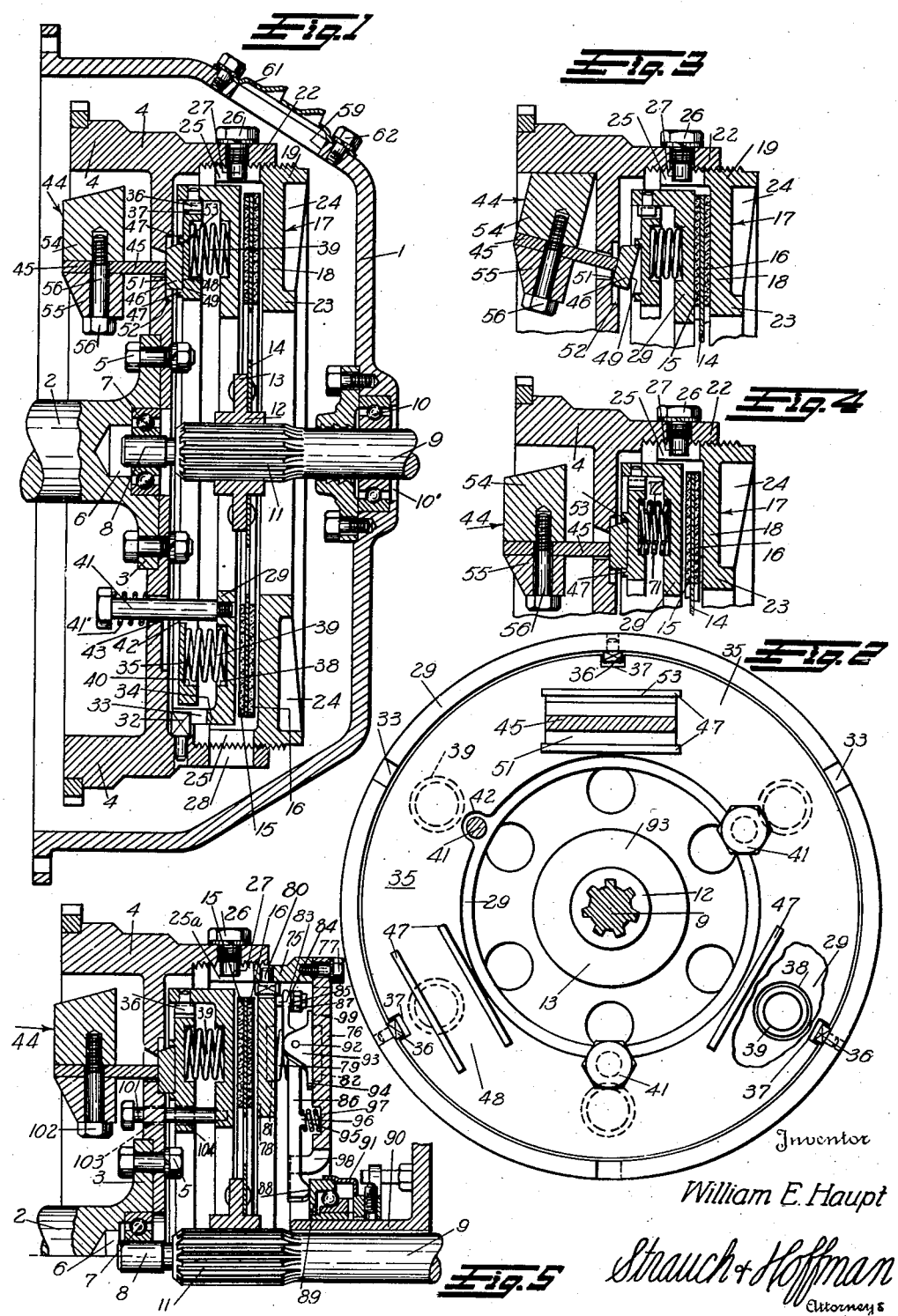
Inventor
William E. Haupt
Strauch & Hoffman
Attorneys Patented Aug. 17, 1937

2,090,397

UNITED STATES PATENT OFFICE 2,090,397

AUTOMATIC CLUTCH MECHANISM

William E. Haupt, Brooklawn, N. J., assignor to Automatic Drive and Transmission Company, Gloucester City, N. J., a corporation of New Jersey Application July 25, 1933, Serial No. 682,127

11 Claims. (Cl. 192—105)

The present invention relates to automatic drive and clutch mechanisms, adapted to transmit power from a driving to a driven shaft, and although they possess operating characteristics and structural features that particularly adapt them for motor vehicle and similar drives, they may be successfully employed in a wide variety of power transmitting drives.

More particularly, the present invention relates to automatic clutch mechanisms of the type wherein a driving member is mounted for axial movement of and is driven by a supporting member and is actuated by speed responsive mechanism to frictionally grip or clamp a driven member between it and the supporting member.

Automatic clutch mechanisms of this general character have been heretofore proposed, but they are so designed that the cost of producing them is excessive; they are so extremely bulky as to render them inapplicable to motor vehicle and like drives; they fail to transmit reasonable amounts of power in comparison with their size, and their operating characteristics are such as to render them wholly unsuitable for incorporation in motor vehicle or like drives. These major factors have so militated against these prior mechanisms that they have not been adopted in practice, and they accordingly have no successful commercial history.

A serious defect inherent in prior automatic clutch mechanisms of this general character resides in the fact that the driving member, in response to actuation of the speed responsive mechanism, solidly grips the driven member between it and its supporting member, with the result that pressure builds up so rapidly between the engaging faces of the driving and driven members that a torque of rapidly increasing and widely fluctuating magnitude is accordingly transmitted to the driven member, and the latter and the drive mechanism and load to which it is connected are accelerated in an uneven manner, with the result that shocks are transmitted to the drive mechanism and load, that are so severe in some instances that parts thereof are actually distorted or broken under the stresses set up in them. The entire engaging operation of these prior mechanisms occurs over a small range of speed of the driving member, and establishes a positive frictional coupling between the driving and driven members at a fairly low speed, with the result that if an internal combustion engine, a high speed electric motor, or a steam turbine is employed as the prime mover, the latter is accordingly compelled to accelerate the load when operating at a low torque delivery speed, and is often stalled by such engaging operation. This type of operation moreover causes clutch engagement to occur with a harsh grabbing or chattering action, and this feature of itself renders such prior mechanisms wholly unfit for drives where a smooth power transmission is desired.

Another highly objectionable feature attending the operation of prior automatic clutch mechanisms of the character mentioned resides in the fact that the driving member is forced into engagement with the driven member in misalignment, with the result that clutch engagement often occurs with a chattering and grabbing action, the driven member is subjected to a twisting action with each revolution of the clutch members and rapid wear of the facing material is produced. This objectionable feature also often causes localized areas of the engaging members to be heated to high temperatures with the result that the driving and driven members are warped or distorted and smooth clutch action is further impaired and the useful life of the mechanism materially shortened.

Clutch mechanisms of this general character have also been heretofore proposed wherein manually operable mechanism is provided for moving the driving member away from the driven member against the action of the speed-responsive mechanism for the purpose of disconnecting the driving and driven shafts. These mechanisms have proven to be highly impractical for the reason that even at moderately high speeds, the forces exerted by the speed-responsive mechanism are so great, that it is extremely difficult, if not altogether impossible to manually withdraw the driving member from the driven member for declutching purposes.

Prior automatic clutch mechanisms of this character that have been heretofore proposed possess a further objectionable operating feature that has militated against their adoption in many power drives. This feature resides in the fact that when the prime mover, or other mechanism that delivers power to the driving member, is operating at, or below, idling speed, it is impossible to establish a driving connection between the driving and driven shafts with such prior clutch mechanisms. It is clearly desirable that the mechanism be capable of effecting a driving connection between the driving and driven shafts regardless of whether the latter are rotating or stationary. For instance, in motor vehicle drives, it is frequently necessary to place the transmission in gear and tow or coast the vehicle in order to turn the engine over for cranking purposes when either the starting crank is lost or the engine is cold and stiff or the battery low. It is also desirable, when parking on a steep grade, to use the motor as an auxiliary brake by placing the transmission in low or reverse gear. It is also sometimes desirable to place the transmission in low or reverse gear when the engine is dead, and propel the vehicle away from a dangerous location by means of the starting motor.

It is a primary object of the present invention to devise novel automatic clutch mechanisms that will automatically transmit torque of slowly increasing magnitude from a driving to a driven member, when one of the members is accelerated, that are extremely flexible and efficient in operation and adapt themselves to a wide variety of power transmitting drives, that are simple and rugged in design and stand up well in use, even under severe operating conditions; and yet that may be manufactured by low cost, quantity production methods.

A further object of my invention is to devise for use in clutch mechanisms of the type wherein a driving member is adapted to frictionally engage a driven member; a novel speed responsive mechanism for forcing the driving member into engagement with the driven member in such manner that pressure is slowly built up between the driving and driven members and a torque of slowly increasing magnitude is transmitted from the driving to the driven member when the driving member is accelerated.

It is a further object of my invention to provide automatic clutch mechanisms of the type wherein a yielding connection is interposed between a speed responsive mechanism and a driving member; with novel mechanism for equalizing the forces transmitted from the speed responsive mechanism to the driving plate and for insuring the application of substantially uniformly distributed driving pressure to the latter.

Another object of my invention is to devise for use in clutch mechanisms wherein a force applying mechanism is resiliently connected to a driving plate; a novel speed responsive mechanism for applying forces to the force applying mechanism.

It is a further object of the present invention to devise for use in clutch mechanisms of the type wherein frictional members or plates are adapted to be brought into engagement for transmitting power from a driving shaft to a driven shaft; a novel mechanism for forcing the plates into frictional engagement when one of the shafts attains a predetermined speed, which is so designed that the parts thereof may be produced by other than precision methods without impairing their desired operating characteristics.

My invention further aims to provide clutch mechanisms of the character wherein frictional members or plates are adapted to be forced into engagement for establishing a driving connection between a driving and a driven shaft; with a novel speed responsive mechanism for forcing the plates into engagement which has a substantially greater travel or larger range of operative movement than that of prior speed responsive mechanisms; and to design the clutch parts in such manner that the forces developed by speed responsive mechanism are transmitted smoothly to, and are distributed uniformly over the plates, even though the clutch parts are made by non-precision, quantity production methods.

Another object is to provide automatic clutch mechanisms of the type wherein a speed responsive mechanism is resiliently interconnected with, and is adapted to apply forces to a driving plate; with mechanism for causing the forces applied to the driving plate by the speed responsive mechanism to build up in two or more stages.

My invention further aims to devise, for use in conjunction with automatic clutch mechanisms of the type having a driving and driven member mounted for engagement and disengagement, and wherein a speed responsive mechanism is resiliently interconnected with, and is adapted to apply driving forces to the driving member when the latter attains a predetermined speed, a novel mechanism for disengaging the driving and driven members independently of the operation of the speed responsive mechanism when they are engaged under the influence of the latter.

Further objects of the present invention will become apparent as the specification proceeds in connection with the drawing, and from the appended claims.

In the drawing:

Figure 1 is a longitudinal sectional view of a clutch mechanism forming part of my invention.

Figure 2 is a view of the ring member of the mechanism shown in Figure 1 as it appears when viewed from the left hand side of that figure, with parts broken away and other parts in section to more clearly illustrate the structure involved.

Figure 3 is a fragmental sectional view of the device disclosed in Figure 1, and it illustrates one of the weight assemblies in its outermost or engaged position.

Figure 4 is a fragmental sectional view of a modified form of my invention.

Figure 5 is a fragmental sectional view of a further modification of my invention.

With continued reference to the drawing, wherein like reference characters designate like parts throughout the several figures, a bell housing 1 encloses the clutch mechanism and is adapted to be secured to a prime mover or supported in any suitable manner (not shown).

Rotational efforts are adapted to be transmitted to the clutch mechanism through a drive shaft 2 which in this instance comprises the drive shaft of an internal combustion engine, although other sources of power may be employed. Drive shaft 2 is provided with an annular flange 3, which is adapted to be secured to a flywheel 4, or like rotatable supporting member, by bolt assemblies 5 or other suitable securing means.

Shaft 2 is provided with an annular bore 6 which receives a bearing assembly 7 for supporting the reduced end 8 of clutch shaft 9. The other end of the clutch shaft is supported in a suitable bearing 10 which is received in a recess 10' in housing 1. Mounted on a splined portion 11 of shaft 9 is a hub member 12 having an annular flange 13. Flange 13 is adapted to have a driven disk 14 secured thereto. Disk 14 is secured to flange 13 in any suitable manner, such as by rivets or the like.

Adjacent its outer edge, disk 14 carries friction faces 15 and 16 which are made of a material having properties adapting it for the purposes and functions required of it. Although any suitable material is contemplated, I prefer to use the material that has proven to be highly successful in the clutch devices of this character and which is described and claimed in Heinrich Patent 1,979,880, issued November 6, 1934.

Facing 16 is adapted to be frictionally engaged by a plate 17 which is mounted for synchronous rotation with the flywheel in a manner to be hereinafter pointed out. Plate 17 preferably comprises a centrally disposed engaging portion 18 which is suitably machined for engagement with the facing 16. Plate 17 is further provided with a threaded rim portion 19. Threaded portion 19 is screw threadedly received in a rearwardly extending flange 22, preferably integrally formed on flywheel 4. Plate 17 is also provided with a central annular flange 23 which functions to strengthen the plate in the area of the inner edge of frictional engaging face 16. Radial ribs 24 are also provided on plate 17 to further strengthen the latter and insure that application of the driving pressure thereto will not tend to harmfully distort or warp it.

The outer rim of plate 17 is provided with apertures 25 which serve the dual purpose of providing means for locking the plate in adjusted angular position within flange 22, and for providing air passages to circulate air through the clutch to cool it and carry off any particles of dust which have been freed from the clutch faces incident to wear.

Plate 17 is adapted to be locked in position by means of a bolt 26 which is threaded into flange 22 of the flywheel and is provided with a reduced locking end 27 which cooperates with one of the apertures 25. Irrespective of whether one or more locking bolts 26 are provided, the parts are so designed that whenever a lock bolt is engaged with one of the recesses in plate 17, the remaining apertures 28 of the flywheel align with apertures 25 formed in plate 17, and heated dust-laden air may be freely exhausted through the passages thus formed. Adequate ventilating or exhaust parts are therefore insured regardless of which aperture 25 happens to be cooperating with lock bolt 26.

The adjusting organization just described permits plate 17 to be adjusted toward and away from the flywheel and yet restrains the plate against rotation when bolt 26 is locked in place.

Friction facing 15 is adapted to be frictionally engaged by a plate 29. Plate 29 is adapted to be actuated axially so as to grip disk 14 between it and plate 17, by means which are responsive to the rotational speed of the flywheel, which means will be more fully hereinafter described. As plate 29 is automatically actuated it will be hereinafter referred to as the automatic plate.

Plate 29 is keyed to the flywheel in any suitable manner, for example by driving studs 32 which cooperate with the walls of recesses 33 formed in a flange portion 34 provided on plate 29. Studs or driving lugs 32 are secured in apertures in flywheel 4 in any desired manner.

From the preceding description it will be apparent that plates 17 and 29 constitute the driving members of the clutch and are associated with the flywheel in such a manner that they are caused to rotate with it, and they cooperate with the driven member to impart rotation to the clutch shaft 9 in a manner to be presently described.

Positioned between the flywheel web and plate 29 is a disk-like ring member 35 which is mounted for synchronous rotation with plate 29 by means of keys 36 secured in apertures in flange 3 of plate 29. Keys or lugs 36 cooperate with the walls of recesses 37 formed in ring 35. Recesses 37 are of sufficient width to allow ring 35 to tilt or rock slightly angularly with respect to plate 29 for a purpose which will be hereinafter described.

Plate 29, on the face opposite to that adapted to engage friction face 15, is provided with circular bores 38 or the like which are adapted to receive and center driving springs 39. The other ends of springs 39 are received in similar bores 40 formed in ring 35. The number of springs required in a particular construction depends upon the torque and power transmitted in the particular installation involved. In the present instance six springs are employed.

Bolt members 41, having reduced portions, are threadedly secured to plate 29. Bolts 41 pass through suitable slots 42 in ring 35 and also extend through aligned apertures 43 in the flywheel web. Positioned between the heads of bolts 41 and the flywheel web are compression springs 41'. The bolt and spring assemblies just described operate to urge the automatic plate to the left, and hold it out of contact with the driven member when the driving shaft is operating at or below idling speed. The hold-back assemblies accordingly cause springs 39 to be lightly gripped between plates 29 and 35 when the clutch is disengaged and they accordingly maintain springs 39 in proper assembled relation under these conditions, and they will be hereinafter referred to as hold-back assemblies. The forces set up in springs 39 through the action of the hold-back assemblies causes ring 35 to be urged toward the flywheel.

Suitable speed responsive means are employed to cause the driving members to frictionally grip the driven member of the clutch between them. Although any suitable speed responsive means is contemplated, the means preferably employed in the present embodiment of my invention comprise centrifugally operable means. The particular centrifugally operable means employed comprises weight assemblies which are suitably pivoted in a manner that will allow them to operate in response to the speed of the flywheel.

The preferred form of speed responsive mechanism is associated with the automatic plate and comprises weights designated generally by the numeral 44. Weights 44 comprise lever portions 45 and head portions 46. Head portions 46 are normally clamped between the flywheel web and ring member 35 when the clutch is stationary or running at idling speed, and under such conditions the parts appear as they are seen in Figure 1, with the plates disengaged. Ring 35 is provided with upstanding chordally extending ribs 47 which provide rectangular recesses 48 for the reception of heads 46 of weights 44. Heads 46 are provided with a flat surface 49 which cooperates with the flat bottom of recesses 48. Heads 46 are further provided with flat surfaces 51 which may be hardened and polished, and which are adapted to cooperate with the flat surface of an annular recess 52 formed in the flywheel web. Recess 52 is preferably machined in the flywheel web to provide surfaces against which heads 46 may react which is exactly normal to the axis of the mechanism and it is to be understood that it is unnecessary to provide such recess where the flywheel web or other reaction member has a sufficiently accurately formed surface. The outer sides of heads 46 are cut at an angle or relieved in order to provide a knife-like edge 53. Knife edges 53 cooperate with the outer dihedral angles formed by the bottoms of recesses 48 and the outer upstanding ribs 47. Knife edges 53 provide pivots or fulcrums about which weights 44 swing in response to centrifugal force during operation of the clutch. It will be further seen from the drawing, that the body of each weight 44 is formed in two sections 54 and 55 which are held in assembled position on lever portion 45 by means of bolts 56 which are preferably two in number. Lever portions 45 may be inserted in the apertures in the flywheel from the right hand side of Figure 1. Body sections 54 and 55 then may be secured to the projecting lever ends by bolts 56.

Plate 17 may be axially adjusted by removing lock-bolt 26 and rotating plate 17 as a unit as previously described to establish proper plate clearance. This adjustment is originally made at the factory or at the point where the clutch is assembled. After the clutch has been in use and facings 15 and 16 become thin as the result of wear, this adjustment may be effected to compensate therefor and reestablish proper plate clearance. Adjustment may be conveniently made when housing 1 is provided with an inspection opening 59 normally closed by a suitable cover 61 secured to housing 1 by cap screws 62 or the like. A wrench or other suitable tool may be inserted through opening 59 and lock nut 26 may be removed and plate 17 rotated in the proper direction to establish proper plate clearance.

The adjustment just described shifts the whole plate assembly and therefore does not in any way change the compression on the driving springs or the hold-back springs. This feature is highly desirable since it is essential for satisfactory operation that the springs exert at all times a predetermined force relative to each other in order that the clutch will not engage at too low or too high an engine speed. It is also necessary for satisfactory operation to keep the final engagement pressures of the clutch mechanism up to a predetermined minimum in order to secure non-slipping drive.

It will be observed that the clutch disclosed in Figures 1—3 is a fully automatic clutch, there being no manual control means associated therewith. The operation of this clutch mechanism will now be described.

*Operation*

Rotation of shaft 2, under the influence of the prime mover causes flywheel 4 and the clutch driving members or plates 17 and 29 to rotate therewith. When the flywheel reaches a predetermined speed of rotation weights 44 swing or rock outwardly about their knife edges 53. The speed at which this rocking action of weights 44 takes place is predetermined by the compression of hold-back springs 41′, and the mass of weights 44. Springs 41′ are adapted to exert the hold-back action previously described and the magnitude of this action is determined by the strength of springs 41′. This action exerts a movement-resisting influence upon plate 29, and it is apparent that by increasing or decreasing the tension on the springs 41′ it will be apparent that the speed of engagement of the clutch may be varied.

As the weights pivot or rock about their knife edges 53 in response to centrifugal force, reaction faces 51 of weight heads 46 fulcrum and undergo a slight sliding action on the faces of recesses 52, and knife edges 53, due to their engagement and fulcruming action upon the flat surface of recesses 48, force ring 35 away from flywheel 4. Actuation of the weights in this manner through the medium of springs 39, causes automatic plate 29 to also move away from the flywheel against the action of the hold-back springs 41′ into its automatic engaged position in engagement with friction facing 15 of disk 14. Axial movement of plate 29 in this manner under the influence of weights 44 causes driven member 14 to undergo axial movement and to be frictionally clamped or gripped between driving members 17 and 29.

During the phase of operation just described, plates 29 and 35 preferably undergo substantial unitary movement, and the pressure built up in springs 39 is relatively low because of their relatively great strength or stiffness in comparison with that of hold-back spring 41′.

After the driven member is thus clamped or gripped between the automatic plate and plate 17, further movement of plate 29 is arrested, and further rocking movement of weights 44 forces ring 35 further away from the flywheel against the action of springs 39 and builds up pressure in the latter. A corresponding pressure is built up between the plates and torque of comparatively slowly increasing magnitude is smoothly transmitted from shaft 2 to shaft 9, and the latter and the load coupled thereto are smoothly picked up by the prime mover. When weights 44 rock outwardly and build up pressure in springs 39, and between the plates, should they rock unevenly or to an unequal extent, plate 35 may tilt and take a slight angular position with respect to plate 29 and thereby tend to compensate for such uneven action. To this end, plate 35 is designed to float between pressure plate 29 and flywheel 4, i. e., plate 35 is not rigidly connected to any other of the clutch parts but is retained in place solely by springs 39 and the heads 46 of weights 44. Due to this novel construction plate 35 is capable of unimpeded free axial tilting which permits plate 35 to distribute any localized application of force due to the unequal outward movement of one or more of the weights over a large area of the plate thereby compressing several of the springs 39 and applying a more equalized transmitting force to plate 29. If plate 35 were not allowed to tilt or rock in this manner, and operate to distribute the forces applied by weights 44, localized forces might be applied to plate 29 with resulting poor clutch operation.

As the prime mover accelerates and weights 44 swing outwardly and cause the driven member to be clamped between the automatic plate and the positive plate, as previously described, movement of the automatic plate away from the flywheel is resisted by the hold-back springs 41′ acting through the medium of the driving springs and ring 35. This restraining action holds weights 44 under control. Hold-back springs 41′ therefore, in addition to predetermining the speed of the mechanism at which automatic engaging operation is initiated, exert a steadying influence upon the clutch parts.

When the flywheel attains a predetermined speed, weights 44 move into contact with the flywheel rim, as seen in Figure 3, and the parts are so designed that when this occurs the pressure between the plates is of such magnitude as to hold them in non-slipping engagement.

When it is desired to disengage the clutch mechanism, the prime mover is allowed to decelerate and consequently the flywheel decelerates. When the predetermined idling speed is reached, hold-back springs 41′ move weights 44 into their normal positions and cause disengagement of the clutch plates.

Although I have illustrated and prefer to employ the centrifugally operable mechanism disclosed, it is to be understood that any desired speed responsive mechanism may be employed to force plate 35 away from the flywheel against the action of springs 39 and 41'.

In Figure 4 there is disclosed a modified form of the invention, and as many of the parts are the same as those employed in the first form of the invention, corresponding parts are indicated by the same reference characters. In this form of the invention the driving springs 39 are replaced by a pair of springs 71 and 72. Springs 71 are gripped between plates 29 and 35 by the hold-back assemblies in the manner previously described, while springs 72 are preferably, although not necessarily, loosely disposed with respect to their seats in plates 29 and 35, when the prime mover is operating at or below idling speed. If desired, springs 41' may be stiff enough to preload springs 71 and/or 72, or springs 71 and/or 72 may be preloaded by any other suitable means without departing from the spirit of the present invention. The operation of this device is as follows:

When weights 44 swing or rock outwardly about their knife edges in response to centrifugal force, plate 29 is moved into engagement with facing 15 of the driven member 14 and grips the latter between plate 29 and plate 17 in the manner previously described. While this portion of the operation is taking place, springs 71 are not compressed appreciably and therefore the clearance between the ends of springs 72 and plates 29 and 35 is maintained.

Further rocking of weights 44 causes pressure to be built up in springs 71, which causes an initial light and smooth engagement of the clutch plates, and a torque of comparatively low and slowly increasing magnitude is initially transmitted to shaft 9. As the springs 71 are further compressed the magnitude of the torque transmitted gradually increases, and shaft 9 is picked up evenly and without grabbing with a slipping drive. When ring 35 has been moved sufficiently to the right under the influence of weights 44 it grips secondary springs 72, which are preferably stiffer than springs 71 between it and plates 29, and at this time the first stage of clutch engagement operation may be said to be at an end, and the second stage initiated.

Further movement of plate 35, under influence of weights 44, causes pressure to build up at a relatively rapid rate, since movement of the plates is now resisted by the combined action of springs 71 and 72. When weights 44 contact the flywheel rim, the plate pressure built up is sufficient to establish a positive drive between the driving and driven members, and there is no slippage between the driving and driven shafts. In the first stage, movement of the ring is resisted by springs 71 and in the second stage this resistance is augmented by springs 72. In actual practice these stages may be designed to merge into each other so completely that the change from one to the other is imperceptible, and a very smooth clutch engagement accordingly is obtained. When it is desired to disengage the clutch mechanism, the flywheel is decelerated, and when the predetermined idling speed is reached hold-back springs 41' move weights 44 into their normal positions and cause disengagement in the manner described in connection with the mechanism illustrated in Figures 1, 2, and 3.

In Figure 5 of the drawing, I have illustrated the mechanism shown in Figures 1, 2 and 3, as it appears when provided with a modified backing plate having declutching mechanism associated therewith. In this device rim 22 of the flywheel is adapted to screw threadedly engage an annular ring member 75. Ring member 75 is provided with apertures 25a that cooperate with locking screw 26, and apertures 28 provided in a flywheel rim in the manner described with reference to Figures 1–3. Suitably secured to the ring 75 is a cover member 76. The securing means in this instance comprises cap screws 77, although any suitable securing means may be used.

A positive plate 78 is provided for engagement with face 16 of the driven member. Plate 78 is resiliently backed by relatively stiff spring assemblies 79 one end of which seats in recesses 81 in the positive plate, and the other ends are received in similar recesses 82, in cover plate 76.

Plate 78 is mounted for synchronous rotation with the flywheel by means of driving lugs 80 secured in recesses in member 75. Plate 78 is further provided with suitable stud members 83 which are located adjacent the periphery thereof. Studs 83 are adapted to be encircled by hardened washers 84 which cooperate with the curved ends 85 of the throwout levers 86. Washers 84 are adjustably held in place on pins 83 by means of castle nuts 87. The inner ends of levers 86 are provided with curved faces 88 which are adapted to contact with a hardened race member 89 of a throwout assembly designated generally at 91; and which may take any suitable form. Throwout assembly 91 is mounted for axial movement on a stationary supporting sleeve 90 and is adapted to be moved axially by means of the usual throwout fork and clutch pedal organization (not shown). Since throwout bearing 91 forms no part of the present invention a detailed description thereof will be omitted.

Lever members 86 are rotatably mounted intermediate their ends on pins 92 which are received in ears 93 of bracket members 94. Bracket members 94 are suitably secured to cover 76 in any suitable manner such as by means of rivets or the like. Cooperating with levers 86 are springs 95 which insure contact of the levers with washers 84 during all phases of operation. One end of springs 95 are received on bosses 96 provided on levers 86, and the other ends are received in recesses 97 in cover member 76. Cover member 76 is further provided with slots 98 to allow free and unobstructed operation of the throwout levers. The cover member is provided with apertures 99 in alignment with pins 83 which provide access to nuts 87 in order to adjust the throwout levers to take up for wear. In the present embodiment three throwout levers are provided. Levers 86 may be adjusted in this manner to establish proper angular relation of the plates with respect to the mechanism, and they may also be adjusted in this manner to bring them into proper angular position after facing wear compensating adjustments have been effected through rotating member 75 within the flywheel.

The clutch pedal (not shown) is preferably provided with a latch mechanism for holding the throwout assembly in its intermediate position shown in Figure 5 against the action of springs 39. With the parts held in this position, and with the flywheel operating at or below idling speed, the parts appear as they are seen in Figure 5, with the clutch disengaged.

As the flywheel is accelerated above idling speed, weights 44 rock outwardly in response to centrifugal force in the manner previously set forth and cause driven disk 14 to be frictionally gripped between plates 29 and 78. As the accelerating operation proceeds, torque of increasing magnitude is transmitted to the driven shaft through the pressure built up in springs 39 and 79. Although springs 39 and 79 have been illustrated as being of substantially equal size and strength, it is to be understood that they may be of different capacities to provide any desired type of clutch engagement, depending upon the requirements of the particular installation involved. Likewise, double spring units of the general type illustrated in Figure 4 may be substituted for springs 39 and/or 79 if desired without in any way departing from the spirit of the present invention.

As the engaging operation just described is taking place, plate 78 is moved to the right, which relieves levers 86 of the pressure of springs 79, and springs 95 move the inner ends of levers 86 to the left, out of contact with the throwout assembly thereby relieving the latter of pressure.

If for any reason it is desired to declutch the mechanism, the clutch pedal may be depressed so as to move the throwout assembly to the left and thereby cause the inner ends of levers 86 to fulcrum about pins 92 and withdraw plate 78 from facing 16 against the action of springs 79. In order to prevent springs 39 from advancing plate 29 into engagement with facing 15 when the declutching operation is taking place, I preferably provide a plurality of headed members 101 which extend through aligned apertures 103 and recesses 104 in the flywheel web and plate 35 respectively, and are threaded into plate 29. Members 101 are designed so that they do not interfere with movement of plate 29 to the right during its automatic engaging operation, but come into play and stop against the flywheel and arrest movement of plate 29 when the declutching operation is being effected.

If it is desired to establish a driving connection between shafts 2 and 9 when the flywheel is operating at or below idling speed or is stationary, the clutch pedal latch may be actuated to allow it to be retracted through the medium of springs 79 acting through levers 86, and the throwout assembly. This operation allows plate 78 to be forced into engagement with facing 16 and thereby grips the driven member between it and plate 29.

Although I prefer to use the type of speed responsive mechanism of the type illustrated, it is to be understood that if desired any other suitable type of speed responsive mechanism may be employed to apply forces to the force transmitting member without departing from the spirit of the present invention. For instance pivoted weight members, supported on the flywheel or other reaction member and having portions extending through apertures therein and engaging plate 35 may be used if desired or springs 39 may be constructed so as to extend through the flywheel apertures and engage the pivoted weight members.

Although I have disclosed, and prefer to employ clutch mechanisms of the "single plate" type, i. e. clutch mechanisms of the character wherein a pair of driving plates or members cooperate with a single driven plate, it is to be distinctly understood that my invention may be readily embodied in clutches of the well known "multiple plate" type, wherein three or more driving members or plates cooperate with two or more driven plates without departing from the spirit of the present invention or from the scope of the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an automatic clutch mechanism, in subcombination, a driving member, a force transmitting member and a reaction member mounted for synchronous rotation and for relative axial movement; a plurality of lever elements having portions disposed between said reaction and power transmitting members and adapted to fulcrum against surface portions thereof, said lever elements and their fulcruming portions being disposed wholly to one side of and located inwardly of the outer periphery of said force transmitting member, and resilient means for transmitting forces from said force transmitting member to said driving member.

2. In an automatic clutch mechanism, a driving member; a driven member; means adapted to force said members into frictional engagement when one of said members attains a predetermined speed comprising speed responsive mechanism operably associated with said members; and means for equalizing the magnitudes of the forces applied to said members by said speed responsive mechanism and for establishing a yielding engagement pressure between said members when they are engaged under the influence of said speed responsive mechanism, said last named means being disposed between said speed responsive mechanism and said driving member and comprising a member mounted for axial and slight tilting movement and which is adapted to have forces applied thereto by said speed responsive mechanism.

3. In a device of the character described, driving and driven members mounted for engagement and disengagement; means adapted to force said members into engagement when one of said members attains a predetermined speed; comprising a plurality of speed responsive elements; means mounting said elements for movement outwardly in response to centrifugal force substantially in planes parallel to the axis of the mechanism; and means for yieldingly transmitting forces from said elements to said driving member, said last named means comprising a force transmitting member against which said elements are adapted to act, said force transmitting member being mounted for axial movement and also being capable of slight rocking movements in response to uneven application of forces thereto by said elements.

4. In an automatic clutch mechanism, a driving member; a driven member; disposed between said driving member and a second driving member; speed responsive means; resilient means for establishing a yielding connection between said speed responsive means and said first driving member; means for resiliently urging said second driving member toward said first named driving member for establishing a yielding engagement pressure between said members when they are engaged under the influence of said speed responsive means; means for disengaging said members against the action of one of said resilient means; and means for limiting movement of one of said driving members toward the other said second driving member under the influence of one of said resilient means.

5. In an automatic clutch mechanism, in subcombination, a driving member; a driving plate and a driven member mounted for engagement and disengagement; a force distributing member mounted for synchronous and relative axial movement with said driving member; resilient means spaced a predetermined distance from the axis of rotation and disposed between said force distributing member and said driving plate and normally urging them away from each other; means adapted to move said force distributing member toward said driving plate against the action of said resilient means when they attain a predetermined rotative speed, comprising speed responsive mechanism having a plurality of fulcruming elements clamped between said driving member and said force distributing member and adapted to apply reactive forces against said driving member and active forces against said force distributing member at a distance from the axis of rotation substantially equal to the distance of said resilient means from said axis.

6. In an automatic clutch mechanism, a driving member; an automatic plate mounted for synchronous rotation with said driving member; a driven plate; a force distributing member; resilient means between said force distributing member and said automatic plate, speed responsive means for engaging said plates, comprising a plurality of levers having fulcrum portions disposed between and acting against said driving member and said force distributing member; said levers extending through apertures in said driving member and having weights carried on the other end thereof; resilient means connected between said driving member and said automatic plate for resiliently opposing the force of said speed responsive means on said force distributing member.

7. In an automatic clutch, a pair of axially spaced driving members having means securing them together for synchronous rotation; a driving plate and a force transmitting element disposed between said members and adapted to undergo axial movement with respect thereto; a driven plate disposed between and adapted to be frictionally gripped between one of said driving members and said driving plate; resilient means interposed between said force transmitting element and said driving plate; and speed responsive means, operable to apply active forces to said force transmitting element and reactive forces to said other driving member, for exerting clutch engaging forces upon said driving and driven plates through said resilient means, said securing means being operable to allow said driving members to be adjusted axially toward and away from each other, to thereby vary the pressure applied to said plates by said speed responsive means.

8. In an automatic clutch mechanism, a driving member; a driving plate; means for securing said driving plate to said driving member; a second driving plate mounted for synchronous rotation with said driving member a driven plate; force distributing means; resilient means disposed between said force distributing means and said second driving plate; speed responsive means for engaging said driving and driven plates when said driving member is accelerated through a predetermined speed range; said means for securing said first-named driving plate to said driving member being operable to adjust said first-named driving plate axially with respect to said driving member to compensate for clutch wear.

9. The combination as set forth in claim 8, wherein said first-named driving plate is screw threadedly engaged in said driving member.

10. In an automatic clutch mechanism, driving and driven members mounted for engagement and disengagement; an automatic driving plate; at least one speed responsive means adapted to force said plate and said driven member into engagement when said driving member is accelerated through a predetermined speed range; means disposed between said plate and said one speed responsive means and reacting against said one speed responsive means for establishing a yielding force transmitting connection between said one speed responsive means and said driving member, said connection including at least two springs, one of which is not preloaded, whereby the forces exerted by said one speed responsive means are applied to said member in stages.

11. In an automatic clutch mechanism, driving and driven members mounted for engagement and disengagement; an automatic driving plate; at least one speed responsive means adapted to force said members into engagement when said driving member is accelerated through a predetermined speed range; and force transmitting means disposed between said plate and said one speed responsive means and reacting against said one speed responsive means for establishing a yielding force transmitting connection and operable to establish a two-stage yielding engagement pressure between said members when said driving member is accelerated through said speed range, said force transmitting means also being operable to cause said engagement pressure to build up at a greater rate in the second stage than in the first stage.

WILLIAM E. HAUPT.